Dec. 16, 1958 R. G. STRAUSS 2,864,124
PLASTIC BLOW MOLDING APPARATUS
Filed Sept. 5, 1957 4 Sheets-Sheet 1
FIG_1
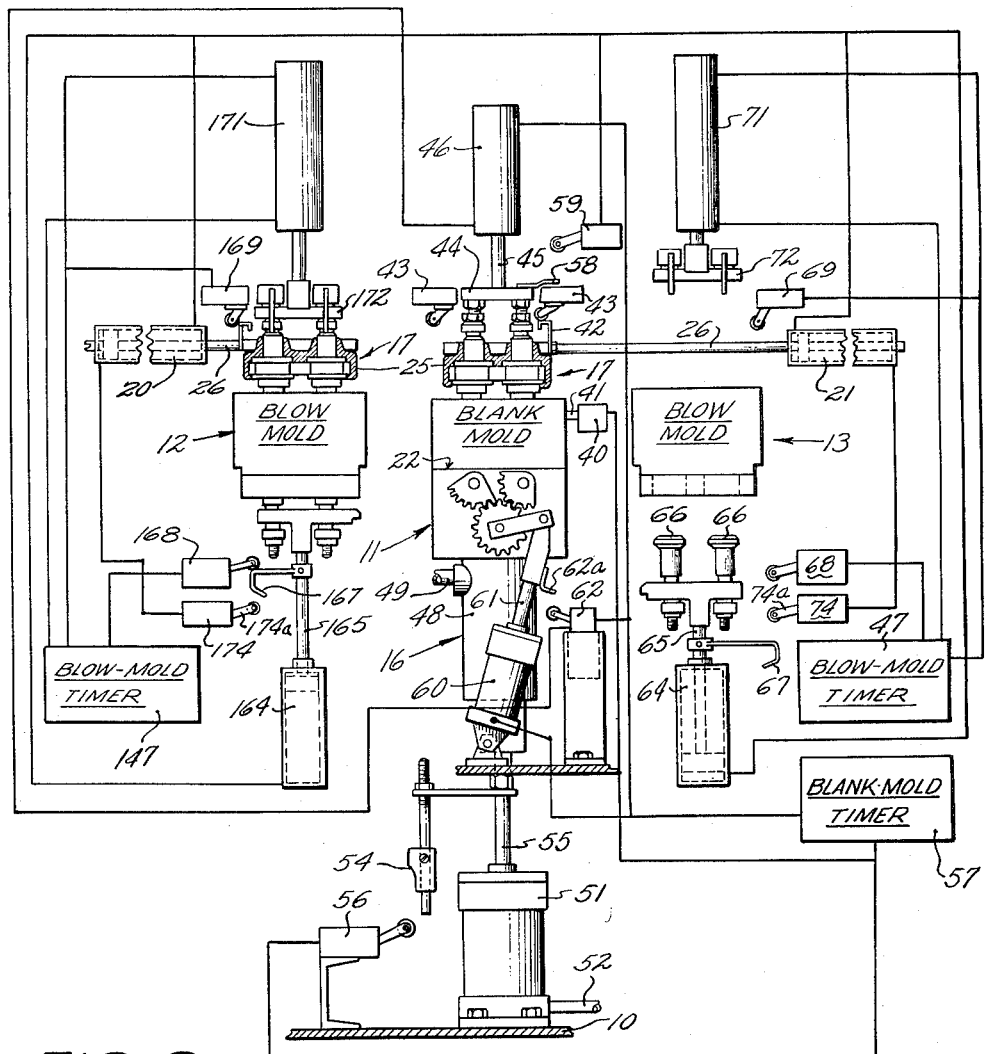
FIG_2
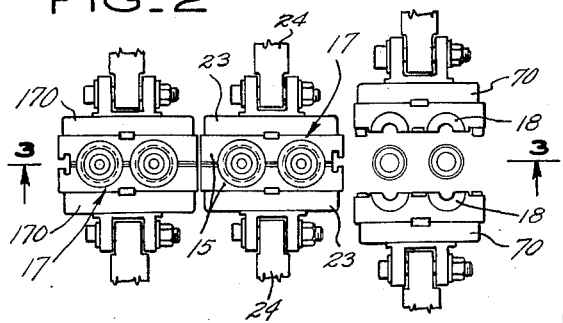
INVENTOR
ROBERT G. STRAUSS
BY Bates + Willard
ATTORNEYS

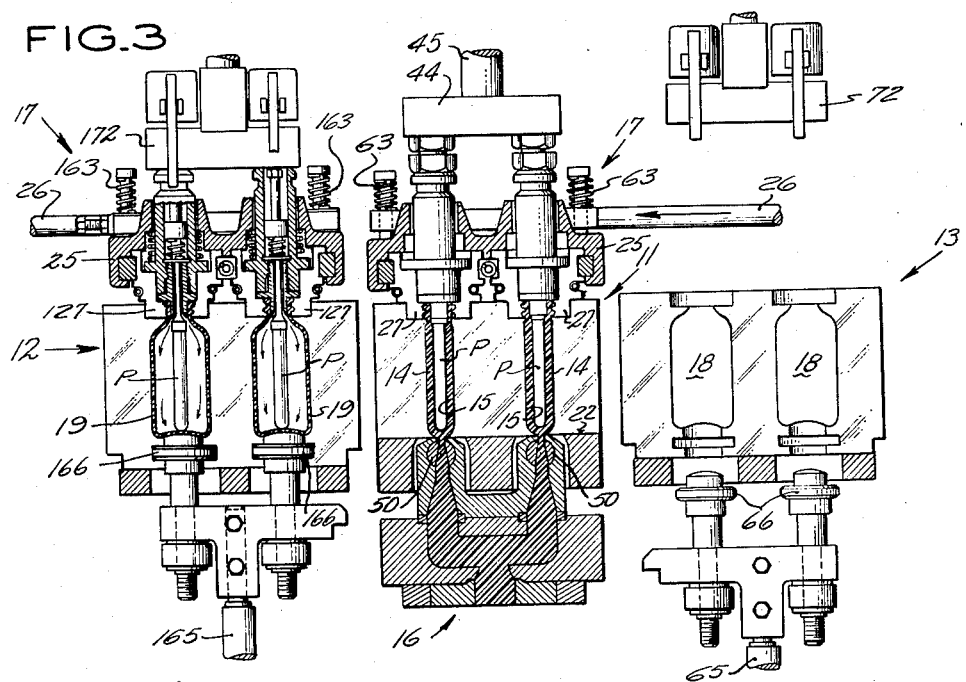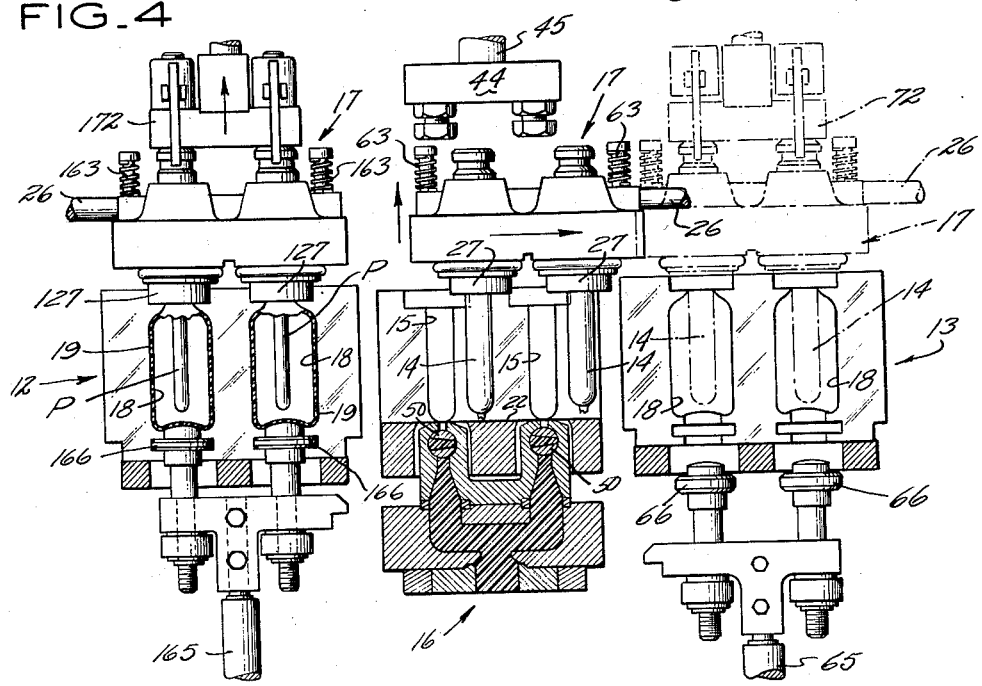

Dec. 16, 1958 R. G. STRAUSS 2,864,124
PLASTIC BLOW MOLDING APPARATUS
Filed Sept. 5, 1957 4 Sheets-Sheet 3
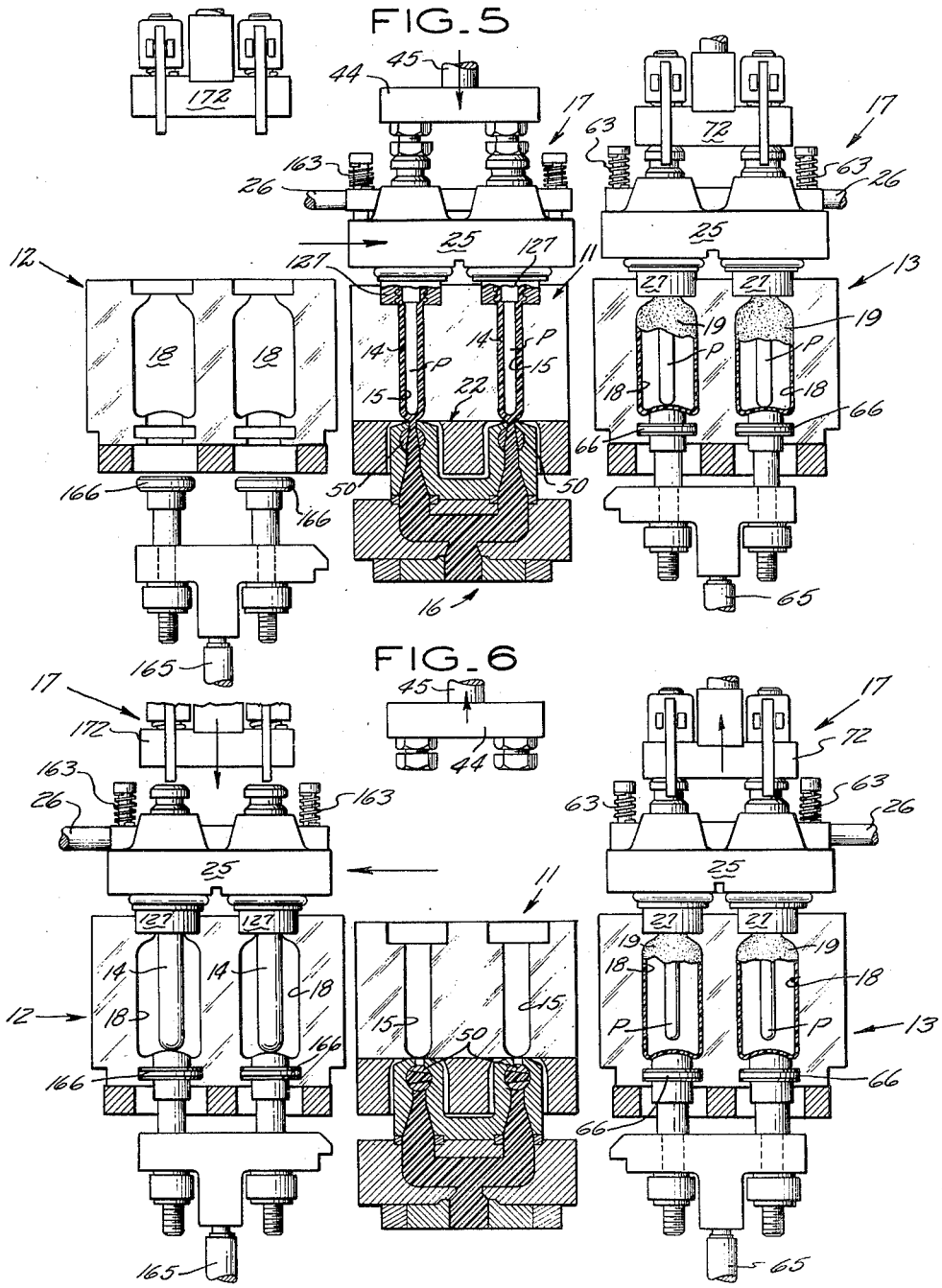
INVENTOR
ROBERT G. STRAUSS
BY Bates & Willard
ATTORNEYS

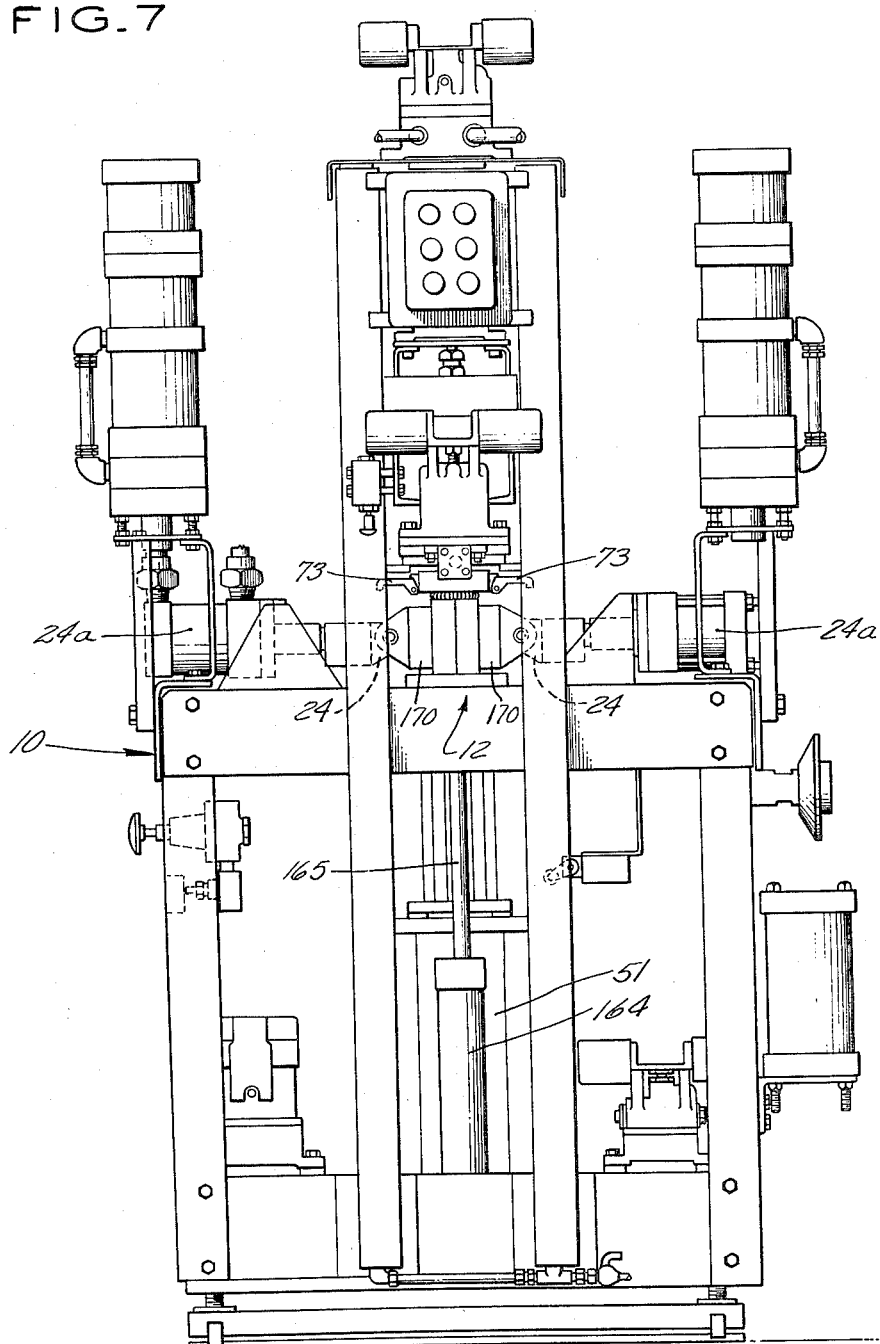

2,864,124
PLASTIC BLOW MOLDING APPARATUS

Robert G. Strauss, West Hartford, Conn., assignor to Plax Corporation, Bloomfield, Conn., a corporation of Delaware Application September 5, 1957, Serial No. 682,166

3 Claims. (Cl. 18—5)

The present invention relates to apparatus for blow molding hollow articles of synthetic and natural resins and other thermoplastic materials which are shape-maintaining at normal temperatures and capable of being reformed under heat and pressure.

More particularly, the invention relates to method and apparatus for fabricating plastic bottles with finished necks and consists of a machine composed of one injection molding blank station and two finish blow stations in fixed positions as opposed to a machine with a rotating table. This machine incorporates a neck ring plunger transfer and employs two independently operated reciprocating neck ring plunger transfer mechanisms so that the injection molding of a bottle blank and the finish blowing of a bottle may be accomplished independently. In this machine, the neck ring and plunger is in contact with the neck of the plastic bottle throughout its formation which assures accurate neck dimensions.

An object of the invention is to provide improved apparatus of the character indicated with which to blow mold bottles, jars and the like from molded blanks or parisons.

Apparatus embodying the invention molds the parisons at fixed blank or parison mold stations and alternately transfers blanks laterally to blow molds at fixed blow mold stations on opposite sides of the blank mold station.

Also, in accordance with the invention, the split blank and blow molds are opened and closed at each station independent of the molds at the other stations.

More particularly, the invention provides apparatus for molding articles from plastic material, which includes a pair of sectional blow mold holders arranged in a row and having separable blow mold sections, the holders including means for opening and closing the mold sections of the blow mold or molds in one of said holders independently of the mold sections of the blow mold or molds in the other of said holders. In addition, apparatus embodying the invention includes a sectional blank mold holder located between said blow molds. In accordance with the invention, means are provided for opening and closing the sections of said blank mold and the sections of said blow molds independently of one another. The apparatus also includes a pair of neck mold carriers, each of which has one or more sectional neck molds and plungers together with means for opening and closing the neck molds on one carrier independently of the neck molds on the other carrier. Means also are provided for moving one of the carriers between the blank mold and one of said blow molds and for moving the other of said carriers between the blank mold and the other of said blow molds independently of each other.

In accordance with the invention, timing means control the movement of said carriers and the opening and closing of the molds so that the plungers are alternately positioned within the blank mold and are concurrently positioned in the blow molds.

Moreover, means are provided for injecting plastic into the blank mold and the neck mold associated with each plunger when the plunger is enclosed within the blank mold, and for blow molding the plastic on each plunger within its associated blow mold.

Other objects and advantages of the invention will be apparent from the following description of the embodiment of the invention illustrated in the accompanying drawings, in which:

Figure 1 is a generally diagrammatic elevational view of apparatus constructed and arranged in accordance with the invention;

Fig. 2 is a plan view of mold and neck ring assemblies shown in Fig. 1;

Figs. 3–6, inclusive, are enlarged cross-sectional views taken generally on line 3—3 of Fig. 2 and showing successive positions of the molds in a sequence of molding operations embodying the invention; and Fig. 7 is an end elevational view of the apparatus shown in Figs. 1–6.

GENERAL DESCRIPTION

Referring to the drawings, the apparatus involves in its general organization a stationary base and frame, only portions of which are illustrated. The several portions of the frame and base are identified with the same reference number 10, it being understood that their showing is generally diagrammatic and that in actual construction they may be integrally connected by additional rigid frame construction (not shown) of conventional design.

Parisons or blanks are formed at a fixed central station 11 and alternately transferred to blow stations 12 and 13 located on opposite sides of the blank or preform station 11.

The invention contemplates the formation of one or more blanks 14 simultaneously at the blank mold station 11. In the illustrated embodiment, two identical blanks 14 may be simultaneously injection molded in a pair of like molds, generally designated 15, 15, with moldable material delivered by a charging mechanism generally designated 16.

Associated with the molds 15, 15 for forming the blanks 14, 14 are a pair of neck ring mold and plunger transfer assemblies, generally designated 17, 17 with which the blanks 14, 14 may be transferred to the blow mold stations 12 and 13 at each of which, as shown in Fig. 6, are a pair of identical blow molds 18, 18, in which the blanks 14, 14 are blow molded into bottles 19, 19, or similar finished articles.

In accordance with the invention, the neck mold and plunger assembly 17 that transfers preforms to the blow mold station 12 is moved between the blank and blow stations by a piston motor 20 independently of the identical assembly 17 that is moved between the blank station 11 and the blow station 13 by a piston motor 21.

*Blank mold station*

Referring more particularly to the molding and charging apparatus located at the blank mold station 11, the blank molds 15 include a pair of split mold sections, the bottoms of which are slidably supported on a stationary table 22 and which are secured to mold holders 23 (Fig. 2) for reciprocal or other suitable movement in well known manner between open and closed positions.

As shown in Fig. 2, the sections of each of the blank molds 15 are secured to the blank mold holders 23 so that opening and closing of the holders serve to open and close the two blank molds 15, 15 simultaneously.

Fig. 2 of the drawings shows fragmentary portions 24 of suitable operating mechanism which preferably includes conventional means, such as the piston motors 24a in Fig. 7 for holding the mold sections closed under heavy pressure during molding operation, in addition to opening and closing the molds under a relatively light working pressure between molding operations.

As heretofore described, one of the identical neck mold and plunger transfer assemblies 17 is movable by the motor 20 between the blank mold station 11 and the blow mold station 12 and the other is movable by the identical piston motor 21 between the molding stations 11 and 13. Secured to the piston rods 26 of each of the motors 20 and 21 are transfer plates 25, each of which carries a pair of identical neck ring and transfer plunger assemblies comprising split neck ring molds 27 and plungers, generally designated P.

The sections of the blank molds 15 close about their respective neck ring molds 27 which together with the plungers P are pressed down firmly for a blank molding operation, as shown in Fig. 3, by a pressure foot 44 on piston rod 45 of a motor 46.

As is apparent from Figs. 4 and 5, the right-hand neck ring and plunger assembly 17 is moved from the blow mold station 13 to the blank mold station 11 by the transfer piston 21 as a result of the downward movement of the member 67 momentarily closing the normally open limit switch 74. Thereafter, and while the left-hand plunger and neck ring assembly 17 remains at the blow molding station 12, a switch operating member 42 on the transfer plate 25 engages a limit switch 43 which actuates the mold closing mechanism 24 thereby closing the mold holders 23, 23 and the blank molds, 15, 15 about the neck ring molds 27 at the blank mold station 11 preparatory to receiving plastic for the formation of blanks or parisons 14, 14 therein.

*Charging mechanism*

More particularly, the charging mechanism 16 includes a cylinder 48 which is supplied with plastic from an extruder or the like (not shown) through a suitable connection 49. Preferably, the plastic is continuously supplied to the cylinder 48 from which it is intermittently discharged into the blank molds 15, 15 through valves 50, 50 responsive to a ram (not shown) within the cylinder 48.

While the neck ring and plunger assembly 17 is being transferred to the blank mold station 11, the valves 50, 50 are closed and the constant supply of plastic under pressure in the supply line 49 fills the cylinder 48 and depresses the ram and the piston 55 of the motor 51. The operating pressure of the motor 51 through line 52 may be maintained constant. However, it generally is preferable to maintain only a low pressure therein while the cylinder 48 is being charged with plastic.

When the cylinder 48 is fully charged, a member 54 secured to the piston rod 55 of the ram motor 51 actuates a limit switch 56 which starts a blank mold timer 57.

The starting of the timer 57 also is dependent upon engagement of a switch 40 by a member 41 responsive to closing of the molds 15, 15 by the closing mechanism 24. When switches 40 and 56 are engaged, the timer 57 actuates motor 60 so as to advance the piston rod 61 and open the valves 50, 50 to permit filling of the molds 15, as shown in Fig. 3, with plastic from the cylinder 48. Concurrently, the timer 57 operates the motor 46 to depress the pressure bar 44 and clamps the plunger and neck ring mold assembly 17 firmly in the closed blank molds 15, 15. At the same time, the timer 57 connects the ram motor supply line 52 with high pressure so that the molds 15, 15 are quickly and compactly filled with plastic before the timer 57 at the completion of a preselected time delay operates the motor 60 to retract the piston rod 61 and thereby close the valves 50, 50. As the rod 61 is retracted, a member 62a thereon engages a limit switch 62 which actuates the mold operating mechanism 24 so as to open the blank mold holders 23, 23 while concurrently releasing the holding pressure and applying lifting pressure to the motor 46 to raise the pressure bar 44.

Preferably, actuation of the limit switch 62 also relieves the pressure line 52 of high pressure so that the cylinder 48 is readily charged with plastic by the pressure supply line 49.

When the injection molds 15, 15 are opened and the plunger bar 44 is raised, the neck rings 27 and plungers P are raised slightly relative to the transfer plate 25, as by means of springs 63, 63 so as to lift the plastic sprues out of the injection nozzles adjacent the valves 50, 50.

Responsive to the upward movement of the pressure plate 44, a switch 59 is actuated by a member 58 and operates the transfer motor 21 so as to transfer the neck ring and plunger assembly 17 with the blanks 14 to the blow mold station 13. Actuation of the switch 59 concurrently acts to operate a motor 64 so as to advance piston rod 65 and thereby raise blow mold bottom plates 66, 66 to an upper or molding position.

Upward movement of the piston rod 65 causes the switch operating member 67, which is carried thereby, to actuate a limit switch 68. Concurrently, the switch operating member 42 on the transfer plate 25 engages a limit switch 69 when the neck ring and plunger transfer 17 reaches the blow mold station 13. When switches 68 and 69 are both engaged by their respective operating members 67 and 42, they actuate the blow mold timer 47 which thereupon operates the motors 24a so as to close mold holders 70 and the blow molds 18, 18 which are carried thereby. Concurrently, the blow mold timer 47 supplies operating fluid to a ram holder 71 which forces a pressure block 72 firmly against the tops of the plungers P, P so that the plungers and the blanks 14 thereon are firmly secured within the blow molds 18, 18 together with the neck ring molds 27, 27 and the bottom plates 66, 66. When the pressure member 72 completes its downward travel, blowing air is introduced into the blanks or performs 14, 14 through the plungers P, P to blow the blanks into molding engagement with the blow molds 18, 18 as shown in Fig. 5. Responsive to the timer 47, the blown bottles 19, 19 are held firmly against the molds 18, 18 by blowing air for a preselected cooling time sufficient for the plastic to attain shape-retaining consistency. At the completion of that time, the blow mold timer 47 acts to operate the motor 71 and thereby raise the pressure plate 72 while concurrently operating the motors 24a, 24a and thereby opening the blow molds 18, 18. As the mold holders 70, 70 approach their fully open position, they engage and retract latching members 73, 73 so that final retraction of the holders 70 opens the sections of the neck ring molds 27, 27 and separates them from the molded plastic therein, thereby permitting the blowing air to discharge the blown articles downwardly off the plungers P. Concurrently, operating air is supplied to the motor 64 so as to retract the bottom plates 66. As the piston 65 completes its retracting stroke, member 67 engages and momentarily closes a normally open limit switch 74, the arm 74a of which closes the switch only responsive to downward pressure of the member 67 as the piston rod 65 descends, and not responsive to upward pressure from the member 67 when the rod 65 raises the bottom plates 66. When switch 74 is engaged, operating pressure fluid is supplied to the motor 21 so as to return the plunger and neck ring mold assembly 17 to the blank mold station 11 where the injection molding of blanks or preforms 14, 14 is repeated, as heretofore described.

The blow molds at blow mold station 12, and the operating mechanism associated therewith, duplicate the apparatus at station 13 and the associated mechanisms heretofore described.

Save for exceptions heretofore apparent, apparatus associated with the left-hand blow mold station 12 has the same reference numbering as the corresponding parts associated with the right-hand blow mold 13, except that for the former the two digit reference members of the latter are preceded by the numeral 1. Thus, for example, the blow mold timer associated with the left-hand blow mold station 12 has the three digit reference number 147, corresponding to the reference number 47 of the timer associated with the right-hand blowing station 13.

In accordance with the present invention, blow molding at the stations 12 and 13 are in part concurrent, and the blank molding time is substantially less than the blow molding time.

More particularly, at the completion of a blank molding operation, the opening of the blank molds is not accompanied by the simultaneous opening of the blow molds at the stations 12 and 13. In fact, the molds of at least one of the blowing stations may remain closed until the blown articles 19 have sufficiently cooled and set therein. At the completion of a blowing operation, the associated plunger and neck ring mold assembly 17 moves to the blank mold station 13 where new blanks are formed and returned to the same blow mold station before the blow molds at the other blow mold station are opened and the associated transfer assembly 17 moves to blank mold station 11. There new preforms or parisons 14 are formed and then returned to the still open blow molds before the molds at the other blowing station are again opened and the molding cycle repeated.

I claim:

1. A machine for molding articles from plastic material, comprising a pair of sectional blow molds arranged in a row and each comprising separable sections, means for opening and closing the sections of one of said blow molds independently of the sections of the other of said blow molds, a parison mold having separable sections, means for opening and closing the sections of said parison mold independently of the sections of said blow molds, a pair of neck mold carriers, a sectional neck mold and a plunger on each of said carriers, means for opening and closing the neck mold on one carrier independently of the neck mold on the other carrier, means for moving one of said carriers between the parison mold and one of said blow molds, means for moving the other of said carriers between the parison mold and the other of said blow molds independently of movement of the other of said carriers.

2. A machine for molding articles from plastic material, comprising a pair of sectional blow molds arranged in a row and each comprising separable sections, means for opening and closing the sections of one of said blow molds independently of the sections of the other of said blow molds, a sectional parison mold located between said blow molds and comprising separable sections, means for opening and closing the sections of said parison mold independently of the sections of said blow molds, a pair of neck mold carriers, a sectional neck mold and a plunger on each of said carriers, means for opening and closing the neck mold on one carrier independently of the neck mold on the other carrier, means for moving one of said carriers between the parison mold and one of said blow molds, means for moving the other of said carriers between the parison mold and the other of said blow molds independently of movement of the other of said carriers, means controlling the movement of said carriers and the opening and closing of said molds, means for injecting plastic into said parison mold and the neck mold associated with each plunger when said plunger is enclosed within the parison mold, and means for blow molding the plastic on each plunger within its associated blow mold.

3. A machine for molding articles from plastic material, comprising a pair of sectional blow molds arranged in a row and each comprising separable sections, means for opening and closing the sections of one of said blow molds independently of the sections of the other of said blow molds, a sectional parison mold located between said blow molds and comprising separable sections, means for opening and closing the sections of said parison mold independently of the sections of said blow molds, a pair of neck mold carriers, a sectional neck mold and a plunger on each of said carriers, means for opening and closing the neck mold on one carrier independently of the neck mold on the other carrier, means for moving one of said carriers between the parison mold and one of said blow molds, means for moving the other of said carriers between the parison mold and the other of said blow molds independently of movement of the other of said carriers, timing means controlling the movement of said carriers and the opening and closing of said molds so that said plungers are alternately positioned within the parison mold and are concurrently positioned in said blow molds, means for injecting plastic into said parison mold and the neck mold associated with each plunger when said plunger is enclosed within the parison mold, and means for blow molding the plastic on each plunger within its associated blow mold.

References Cited in the file of this patent

UNITED STATES PATENTS

| 2,298,716 | Moreland et al. | Oct. 13, 1942 |
| 2,715,751 | Weber | Aug. 23, 1955 |

FOREIGN PATENTS

| 165,061 | Australia | Sept. 7, 1955 |